(12) United States Patent
Johansson et al.

(10) Patent No.: US 8,878,118 B2
(45) Date of Patent: Nov. 4, 2014

(54) CAPACITANCE SELECTABLE CHARGE PUMP

(75) Inventors: Robert Johansson, Oslo (NO); Tore Martinussen, Strømmen (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 323 days.

(21) Appl. No.: 13/586,766

(22) Filed: Aug. 15, 2012

(65) Prior Publication Data

US 2014/0048686 A1    Feb. 20, 2014

(51) Int. Cl.
*H01L 27/146*    (2006.01)
*G05F 3/02*    (2006.01)

(52) U.S. Cl.
USPC .............. 250/208.1; 250/214 R; 327/536; 348/241

(58) Field of Classification Search
USPC ..... 250/208.1, 214 R, 214 P, 214 C, 214 SW; 348/241, 294, 372; 327/535, 536, 540
See application file for complete search history.

(56) References Cited

U.S. PATENT DOCUMENTS

2005/0157193 A1*   7/2005   Kindem et al. ............... 348/294

* cited by examiner

*Primary Examiner* — Kevin Pyo
(74) *Attorney, Agent, or Firm* — Blakely Sokoloff Taylor & Zafman LLP

(57) ABSTRACT

A step-up converter includes an input coupled to receive a first voltage potential and an output coupled to output a second voltage potential higher than the first voltage potential. The step-up converter also includes an array of capacitance charge pumps. Each of the capacitance charge pumps in the array includes switches to be modulated to individually run each of the capacitance charge pumps by selectively connecting each of the capacitance charge pumps to the input and the output. The step-up converter further includes a control module coupled to the switches of each of the capacitance charge pumps and configured to modulate the switches at a substantially fixed frequency. The control module modulates the switches of selected capacitance charge pumps in the array in response to a current draw on the output. The step-up converter may be included in an image sensor.

22 Claims, 7 Drawing Sheets

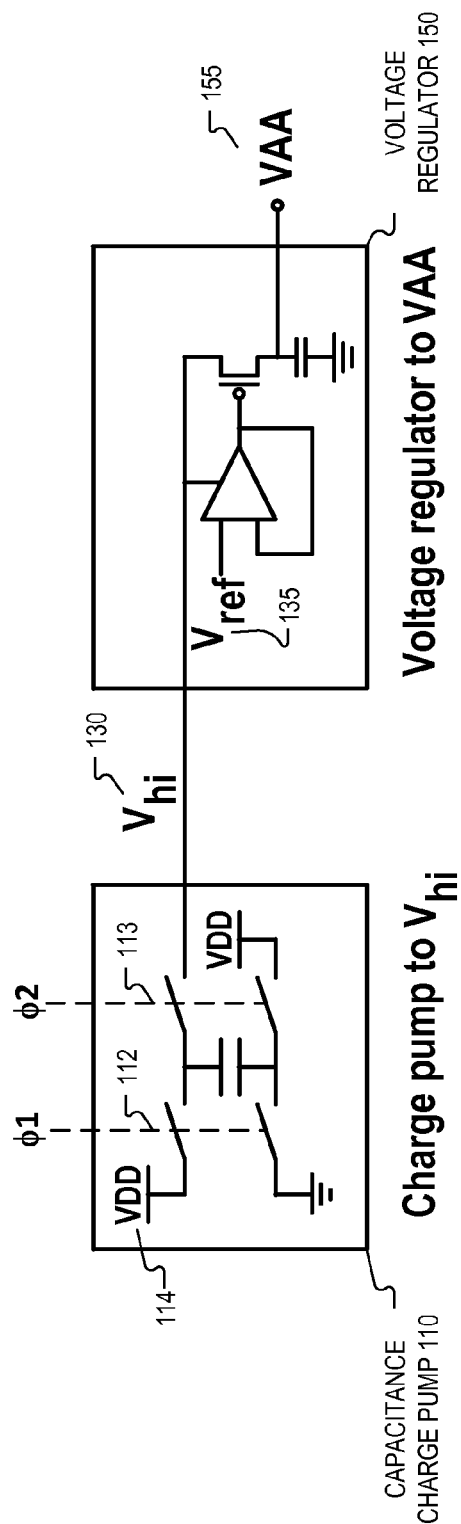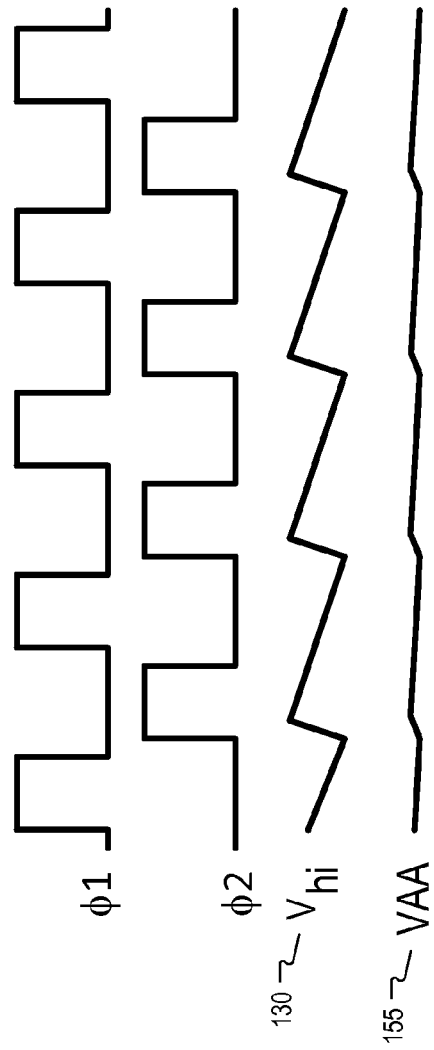
FIG. 1A (PRIOR ART)
FIG. 1B (PRIOR ART)

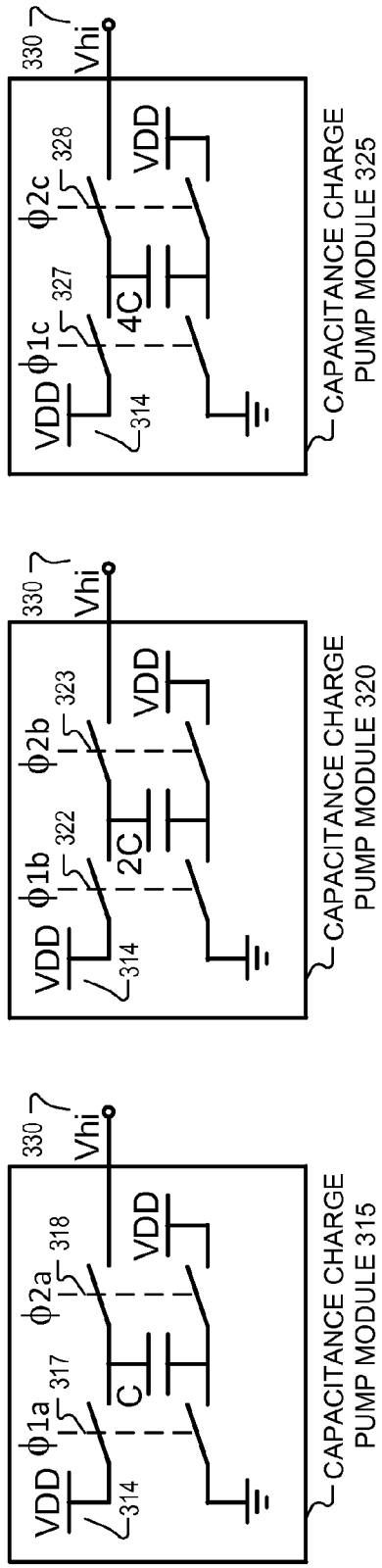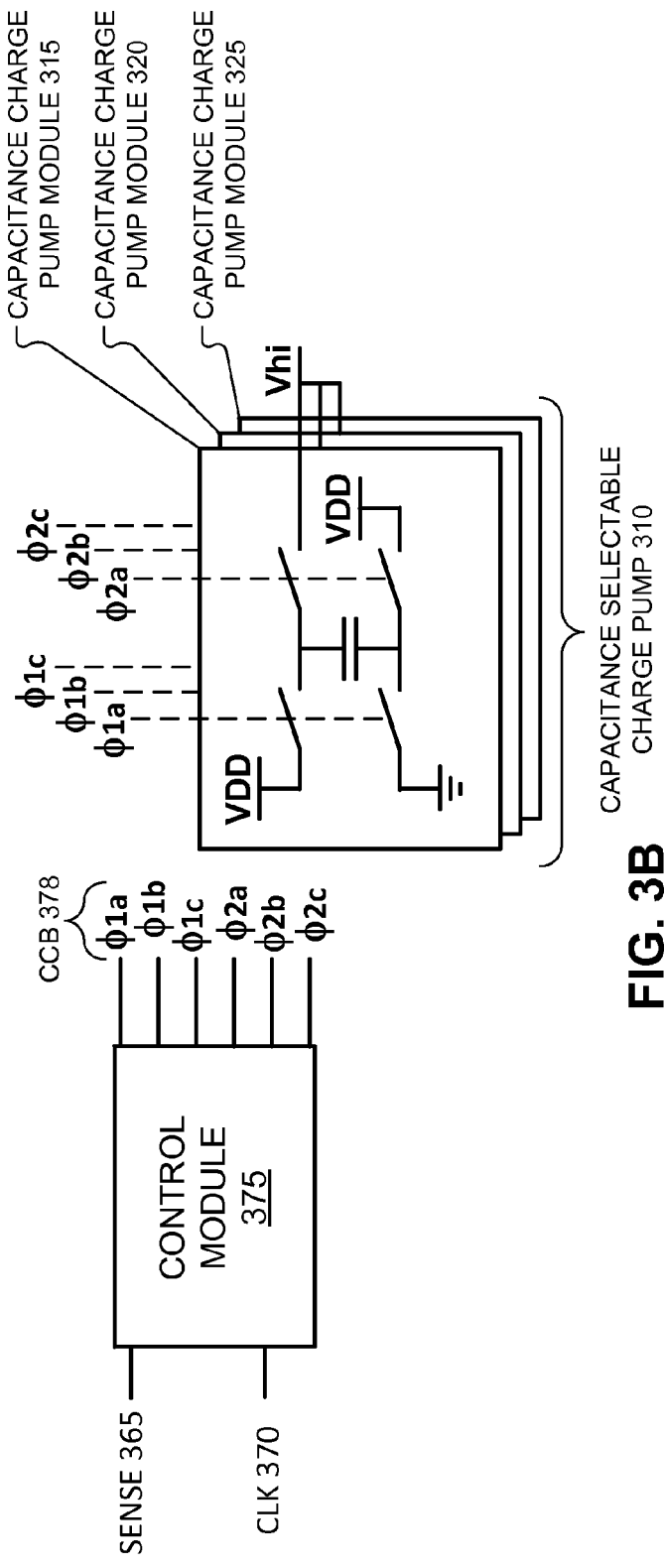
FIG. 3A
FIG. 3B

Clock sequence with high current consumption

Clock sequence with intermediate current consumption

Clock sequence with low current consumption

US 8,878,118 B2

CAPACITANCE SELECTABLE CHARGE PUMP

TECHNICAL FIELD

This disclosure relates generally to power supplies, and in particular but not exclusively, relates to power supplies for image sensors.

BACKGROUND INFORMATION

Image sensors have become ubiquitous. They are widely used in digital still cameras, cellular phones, security cameras, as well as, medical, automobile and other applications. The technology used to manufacture image sensors, and in particular complementary metal-oxide semiconductor ("CMOS") image sensor, has continued to advance at a great pace. For example, image sensors are increasingly higher resolution, lower power, and have better light sensitivity.

In image sensors, and in many other kinds of electronics, power supplies that are both stable and efficient are advantageous. Additionally, power supplies with low noise can be especially advantageous in electronics with sensors, including image sensors. In image sensors, the image quality of an image produced by the image sensor may be especially dependent on a low noise power supply. In particular, image sensors with lower noise power supplies may have better dynamic range, which can assist photographers in capturing images in low light environments. Furthermore, a low noise power supply reduces the burden on designers and manufacturers to include complicated filtering circuits to filter out noise introduced by power supplies. Since image sensors are also commonplace in mobile devices with limited power resources, the efficiency of an image sensor and the power supplies included in or supplying the image sensor are increasingly important to preserving battery life in mobile devices.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1A shows a hybrid block diagram/circuit illustration of a conventional charge pump coupled to a voltage regulator.

FIG. 1B illustrates a conventional timing sequence applied to a charge pump and example voltage levels of voltages generated by the charge pump and the voltage regulator in FIG. 1A.

FIGS. 3A and 3B show a hybrid block diagram/circuit illustration of a capacitance selectable charge pump and a control module, in accordance with an embodiment of the disclosure.

DETAILED DESCRIPTION

Embodiments of an apparatus and method for a regulating a power supply that includes a capacitance selectable charge pump are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A shows a hybrid block diagram/circuit illustration of a conventional charge pump 110 coupled to a voltage regulator 150. Capacitance charge pump 110 receives voltage VDD 114 as an input and steps-up VDD 114 to voltage $V_{hi}$ 130. Capacitance charge pump 110 steps up (or boosts) VDD 114 by modulating switches 112 and 113 using timing signals φ1 and φ2. Voltage regulator 150 is coupled to receive $V_{hi}$ 130 and step it down to VAA 155. Voltage regulator 150 may be used as a way of reducing the power supply ripple to an acceptable level. Typically, VAA 155 has a voltage potential higher than VDD 114, but lower than $V_{hi}$ 130. Voltage regulator 150 may use voltage $V_{ref}$ 135 as an input to ensure that VAA 155 is at the proper voltage potential.

FIG. 1B illustrates an example timing sequence of signals φ1 and φ2 being modulated to boost VDD 114 to $V_{hi}$ 130. FIG. 1B also shows the associated $V_{hi}$ 130 and VAA 155 voltage potentials during the modulation time period of signals φ1 and φ2. In FIG. 1B, VAA 155 has reduced voltage ripple when compared to $V_{hi}$ 130.

Figure 2A:
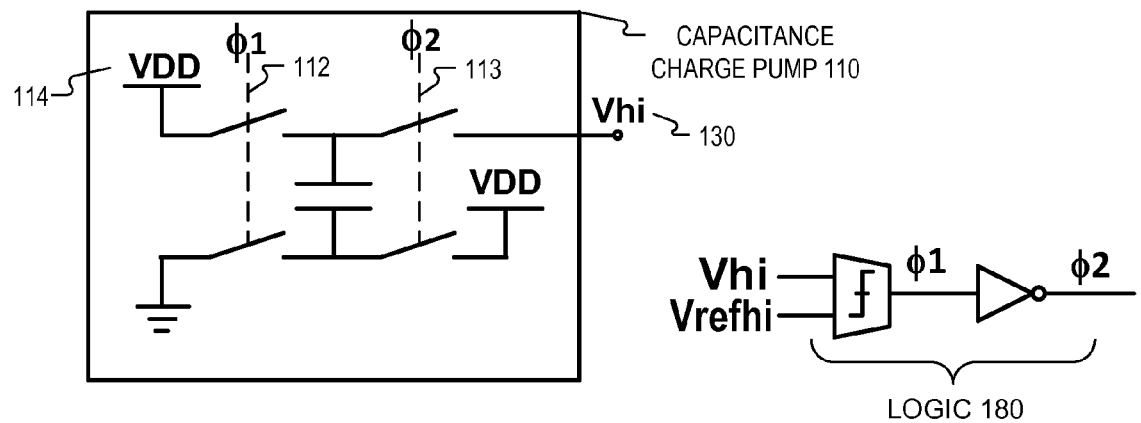
FIG. 2A shows a block diagram of a conventional charge pump and conventional logic for generating timing signals to control a charge pump.

FIG. 2A shows capacitance charge pump 110 and conventional logic 180 for generating timing signals φ1 and φ2 to control capacitance charge pump 110. It is appreciated that illustrated logic 180 are merely logic symbols and that actual implementation of the logic may take the form of a variety of different analog or digital components.

Figure 2B:
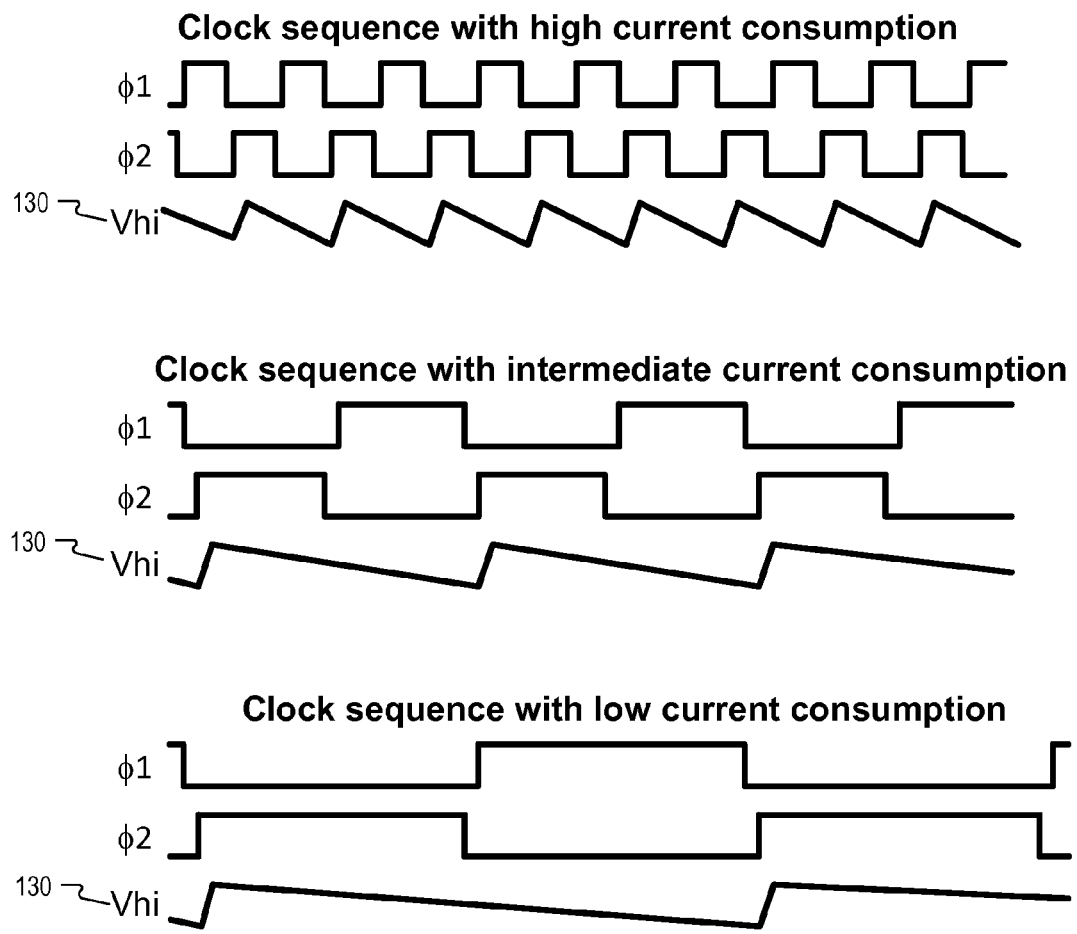
FIG. 2B shows conventional timing sequences and voltage levels associated with different current outputs of a conventional charge pump.

FIG. 2B shows example timing sequences of signals φ1 and φ2 and the corresponding voltage levels of $V_{hi}$ 130 associated with different current outputs of a conventional charge pump. The clock sequence for signals φ1 and φ2 when there is high current consumption on the output of capacitance charge pump 110 is at a higher frequency than when there is intermediate or low current consumption. The clock sequence for signals φ1 and φ2 when there is intermediate consumption on the output of capacitance charge pump 110 is at a higher frequency than when there is low current consumption. Hence, FIGS. 2A and 2B show capacitance charge pump 110 having an asynchronous pump. The timing diagrams in FIG. 2B also show that the ripple frequency on $V_{hi}$ 130 closely follows the frequency of the clock sequence for signals φ1 and φ2 the ripple frequency on $V_{hi}$ 130 is higher when the clock sequence frequency is higher and the ripple frequency on $V_{hi}$ 130 is lower when the clock sequence frequency is lower.

FIGS. 2A and 2B illustrate potential disadvantages of using capacitance charge pump 110 with the given timing sequences. For example, the asynchronous pump frequency may create an unpredictable spiking of the power supply output and the amplitude of the ripple on $V_{h\pm}$130 may not be proportional to current consumption. The asynchronous nature of the pump may necessitate more complex filter circuits to quiet the noise in the power supply. Another potential disadvantage of using capacitance charge pump 110 with the given timing sequences is that the ripple amplitude is substantially the same, regardless of current consumption. This may result in lower efficiency if voltage regulators are used to smooth the ripple because voltage regulators can be less efficient when the "head room" (difference between the input voltage and regulated output voltage of the voltage regulator) is larger.

FIGS. 3A and 3B show a hybrid block diagram/circuit illustration of a capacitance selectable charge pump ("CSCP") 310 and a control module 375, in accordance with an embodiment of the disclosure. In the illustrated embodiment, CSCP 310 includes an array of capacitance charge pump modules including capacitance charge pump module ("CCPM") 315, CCPM 320, and CCPM 325. In other embodiments, CSCP 310 may include two, four, five (or more) CCPMs in the array. CSCP 310 has a pump input coupled to receive a first voltage potential, such as VDD 314. CSCP 310 has a pump output coupled to output a second voltage potential (such as $V_{hi}$ 330) that is higher than the first voltage potential. Each CCPM in the array are coupled to be separately selectable to step-up the first voltage potential (e.g. VDD 314) to the second voltage potential (e.g. $V_{hi}$ 330). Each CCPM in the array includes switches to be modulated to individually run each of the CCPMs by selectively connecting each of the capacitance charge pumps to the input and output of the pump.

In the illustrated embodiment, CCPM 315 includes switch 317 and 318 that are controlled by signals φ1a and φ2a to run (or activate) CCPM 315. When CCPM 315 is running, it steps up VDD 314 to $V_{hi}$ 330. Similarly, CCPM 320 includes switch 322 and 323 that are controlled by signals φ1b and φ2a) to run (or activate) CCPM 320. When CCPM 320 is running, it steps up VDD 314 to $V_{hi}$ 330. Still referring to the illustrated embodiment, CCPM 325 includes switch 327 and 328 that are controlled by signals φ1c and φ2c to run (or activate) CCPM 325. When CCPM 325 is running, it steps up VDD 314 to $V_{hi}$ 330.

FIG. 3B shows control module 375 coupled to control signals φ1a, φ1b, φ1c, φ2a, φ2b, and φ2c, which collectively are Current Consumption Bus ("CCB") 378. Therefore, control module 375 may separately select which of the CCPMs in the array are running by sending digital signals over CCB 378 to the CCPMs. In the illustrated embodiment, control module 375 includes a clock input 370. In some embodiments, control module 375 may include an internal clock generator. Also in the illustrated embodiment, control module 375 includes a sense input 365. Sense input 365 may receive signals that represent a current draw on the output of CSCP 310. Sense input 365 may be coupled to the output of CSCP 310 to monitor $V_{hi}$ 330. Control module 375 may activate and run different CCPMs based on a received signal from sense input 365. In one embodiment, instead of having sense input 365, control module 375 receives a mode command (analog or digital) that instructs control module 375 which CCPMs to run.

Figure 3C:
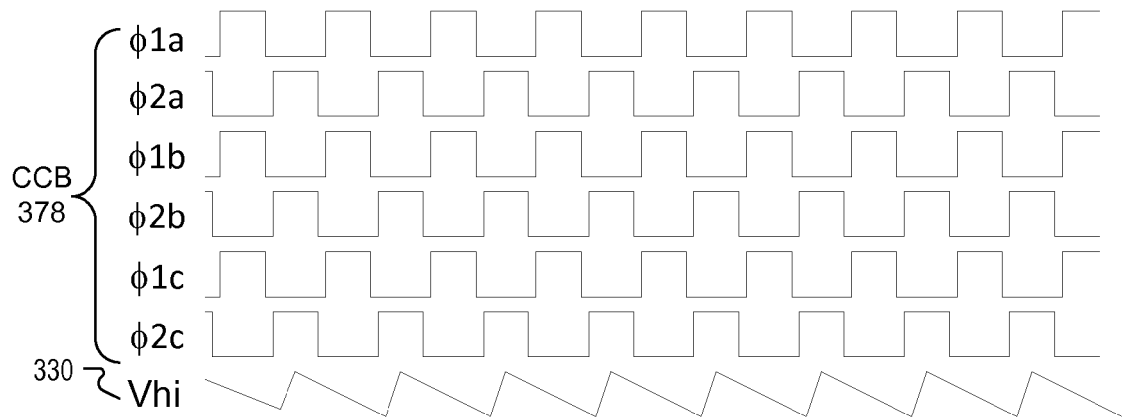
FIG. 3C shows example timing sequences and voltage levels associated with different current outputs of a capacitance selectable charge pump, in accordance with an embodiment of the disclosure.
Figure 3C:
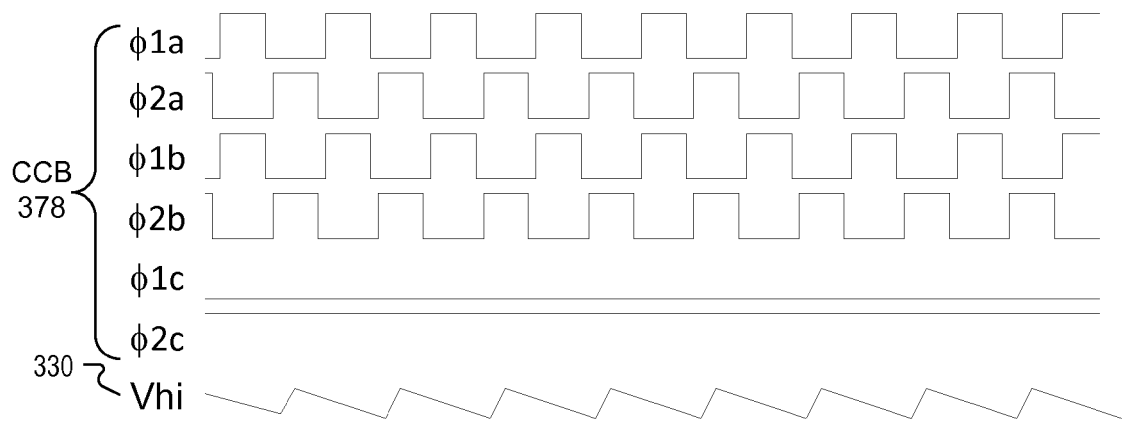
Figure 3C:
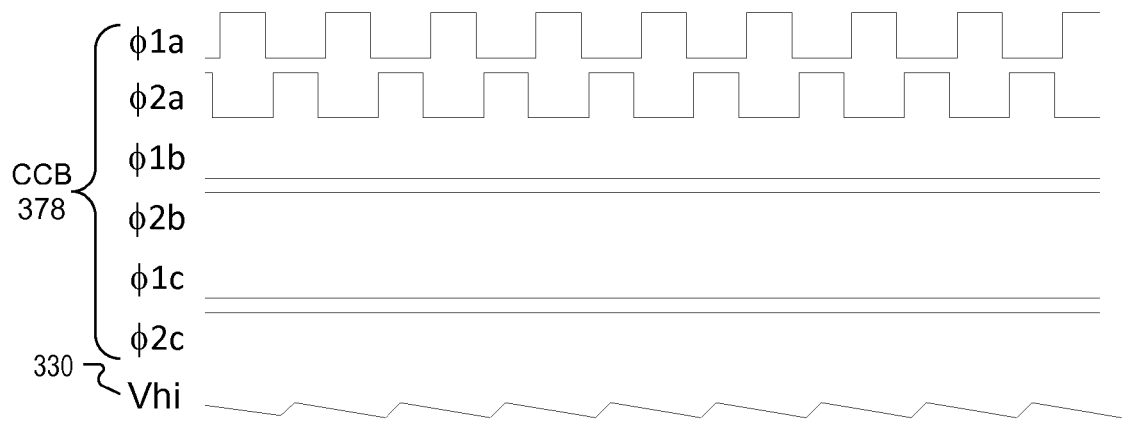

FIG. 3C shows example timing sequences and voltage levels associated with different current outputs of CSCP 310, in accordance with an embodiment of the disclosure. FIG. 3C shows the signal timing sequence of CCB 378 when there is high, intermediate, and low current consumption on the output of CSCP 310. It is appreciated that the modulation sequence of CCB 378 for the CCPMs that are activated to run is at a same, substantially fixed frequency. In other words, the pumping frequency for each of the CCPMs does not change when the current consumption changes. As shown in FIG. 2B, conventional charge pumps increase the pump frequency when the current consumption is higher. In contrast, FIG. 3C shows that control module 375 modulates the charge per clock by activating (and running) more or less CCPMs to provide the required current. For example, when there is high current consumption, control module 375 activates CCPM 315, 320, and 325. When there is low current consumption, control module 375 only activates CCPM 315.

Although FIG. 3C only shows three different current consumption scenarios (high, intermediate, and low), it is appreciated that control module 375 may have up to 3-bit resolution (eight settings) when controlling three CCPMs with three different capacitance values. In the illustrated example in FIG. 3A, CCPM 315 has a capacitance of C, CCPM 320 has a capacitance of 2C, and CCPM 325 has a capacitance of 4C. Hence, control module 375 can run a combination of the CCPMs to provide a charge pump capacitance totaling 0, C, 2C, 3C, 4C, 5C, 6C, or 7C for CSCP 310. Of course, other capacitance values are possible and in some embodiments, the capacitance values in each of the CCPMs in the array are the same. Furthermore, it is appreciated that any resolution is possible, given a corresponding number of CCPMs in CSCP 310. For example, if CSCP 310 includes an array of six CCPMs, 6-bit resolution (sixty-four settings) is possible. It is helpful to note that although a linear response from the capacitors in the CCPMs is desirable, a non-linear response from the capacitors in the CCPMs is also possible.

Control module 375 may be configured to receive a sense signal and then run certain CCPMs to provide the capacitance to supply the appropriate current. Control module 375 may include an analog-to-digital converter to convert an analog sense signal to a digital representation of an analog sense signal. Control module 375 may include a processor, which may have an on-board analog to digital converter. Control module 375 may also be configured to receive a mode command (e.g. a digital word) and run certain CCPMs to provide the capacitance to supply the appropriate current in response to the mode command. In either case, control module 375 may only run the CCPMs that correspond with a minimal needed capacitance. In this disclosure, "minimal needed capacitance" shall be defined as the smallest capacitance available to be selected by control module 375, while still meeting the current draw on the output of CSCP 310. Only running the CCPMs required to meet the current draw may increase efficiency of CSCP 310 by reducing ripple on the output of CSCP 310. As an example, if a capacitance value of more than 4C, but less than 5C is required to meet the current demand on the output of CSCP 310, control module 375 can only run CCPM 315 and 325 to provide the 5C capacitance value. In this case, 5C is the "minimal needed capacitance" available to be selected by control module 375 because 4C would not be adequate and control module 375 does not have the resolution to provide a capacitance lower than 5C, in the illustrated embodiment.

Figure 4:
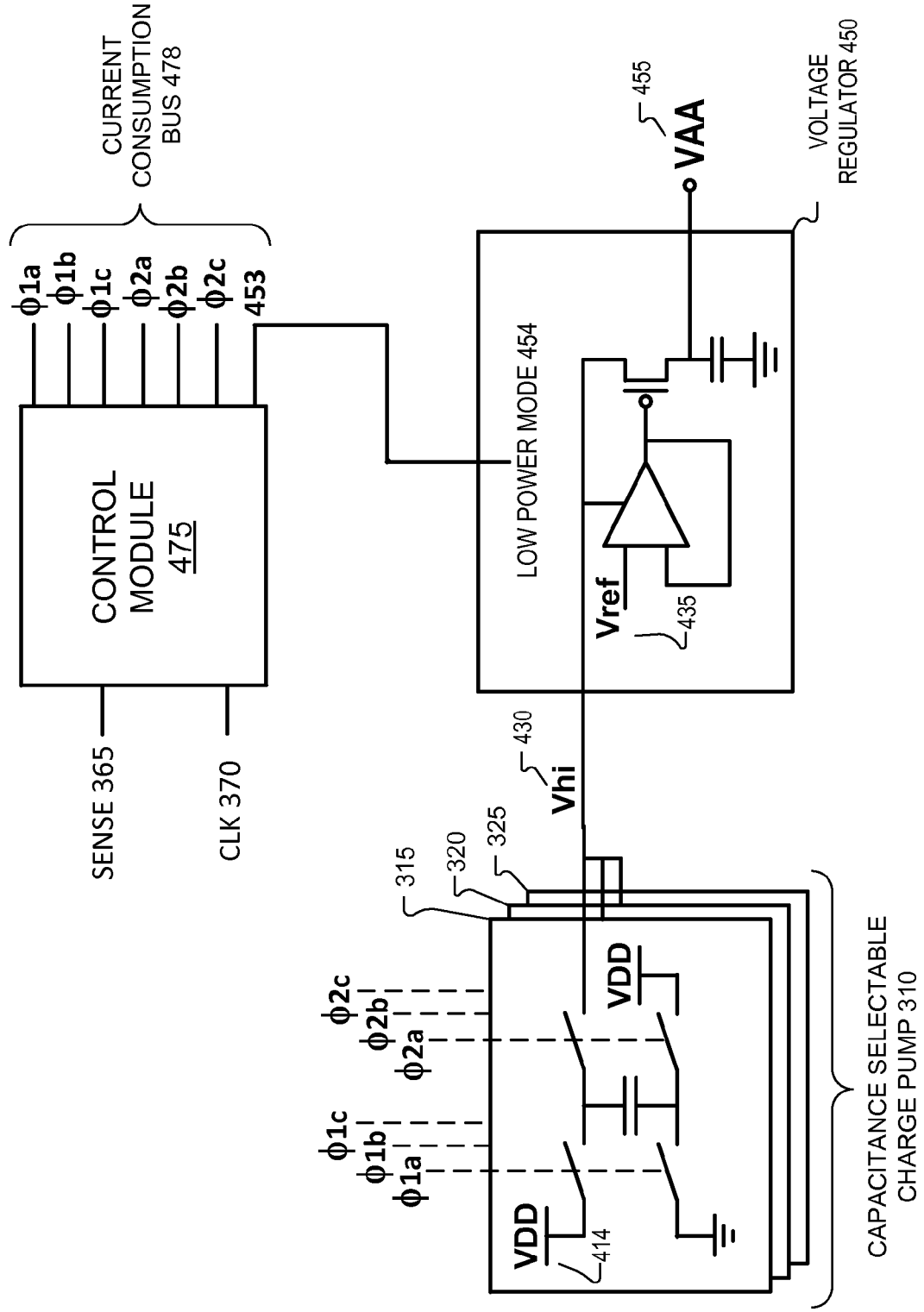
FIG. 4 illustrates an example capacitance selectable charge pump, control module, and voltage regulator, in accordance with an embodiment of the disclosure.

FIG. 4 illustrates CSCP 310, control module 475, and a voltage regulator 450, in accordance with an embodiment of the disclosure. A voltage regulator such as voltage regulator 450 may be coupled to the output of CSCP 310 to smooth any ripple on the output. In one embodiment, voltage regulator 450 includes a low-drop linear regulator, which reduces $V_{hi}$ 430 to VAA 455. In one embodiment, $V_{hi}$ 430 is approximately 2.7 Volts and VAA 455 is approximately 2.5 Volts. Control module 475, CSCP 310 and voltage regulator 450 may be combined into a single power supply module.

FIG. 4 shows that control module 475 includes an additional control line, low power control 453. In FIG. 4, control module 475 is coupled to control CCB 478. In the illustrated embodiment, CCB 478 includes φ1a, φ1b, φ1c, φ2a, φ2b, φ2c, and low power control 453. Low power control 453 is coupled from control module 475 to low power mode input 454, which is an input on voltage regulator 450. When low power mode input 454 is selected by control module 475, voltage regulator 450 enters a low power mode that reduces the current bandwidth. The low power mode may reduce the quiescent current in the voltage regulator. This feature is yet another power efficiency improvement.

Referring back to FIG. 3C, the ripple on the output voltage ($V_{hi}$ 330) of CSCP 310 is reduced as the current consumption decreases. This shows a potential advantage of using CSCP 310 instead of a conventional charge pumps. As FIG. 2B illustrates, conventional charge pumps have about the same ripple voltage, regardless of current consumption. In contrast, FIG. 3C shows that the ripple voltage on $V_{hi}$ 330 is reduced with decreased current consumption. This decrease in ripple voltage gives a more stable output voltage, which may allow voltage regulator 450 to be a "low drop" linear regulator, which are generally more efficient.

Figure 5:
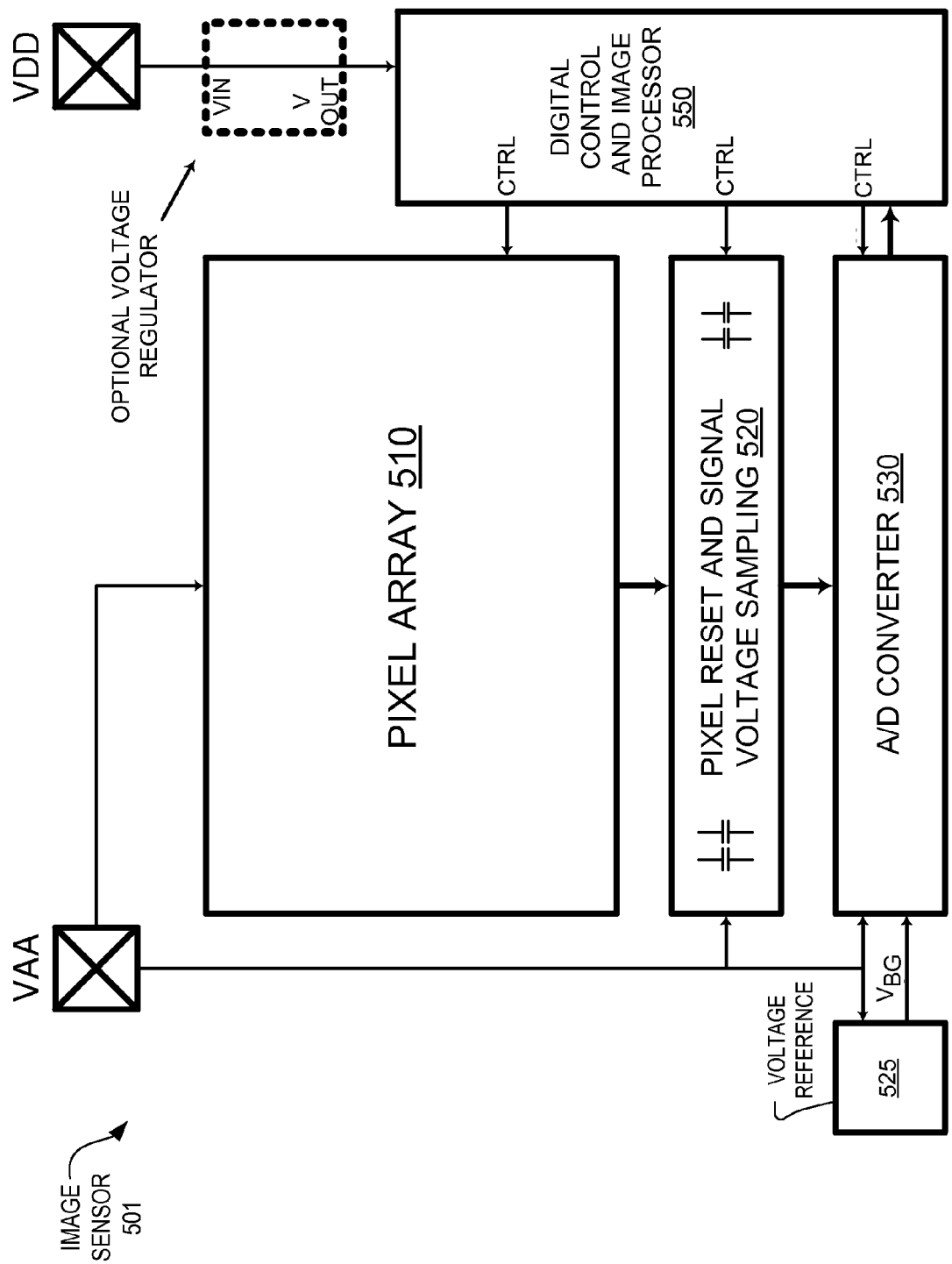
FIG. 5 shows an example image sensor that includes a pixel array and two voltage inputs.

FIG. 5 shows an example image sensor 501 that includes a pixel array 510, a circuit (pixel reset and signal voltage sampling 520) to sample pixel reset and signal voltages of one pixel at a time, and an analog-to-digital ("A/D") converter 530 to convert the pixel signals into digital words. Image sensor 501 also includes a voltage reference 525 that is coupled to A/D converter 530 to provide a reference voltage. Digital control and image processor 550 controls the operation of image sensor 501 and may assist in pre-processing raw images.

The pixel array output voltage signal (the difference between the pixel reset and signal voltage) may be significantly smaller (e.g. 1 V) than pixel power supply voltage VAA (e.g. 2.8V). This means that power may be saved by running pixel reset and signal voltage sampling 520 and A/D convert 530 at a lower voltage. The digital core (digital control and image processor 550) may require its own power supply because it requires a lower voltage than VAA and to protect pixel array 510 from the power supply noise generated by the digital core. If the digital core voltage is lower than the digital Input/Output ("I/O") voltage VDD, an optional voltage regulator may be coupled between VDD and digital control and image processor 550, as illustrated.

Figure 6:
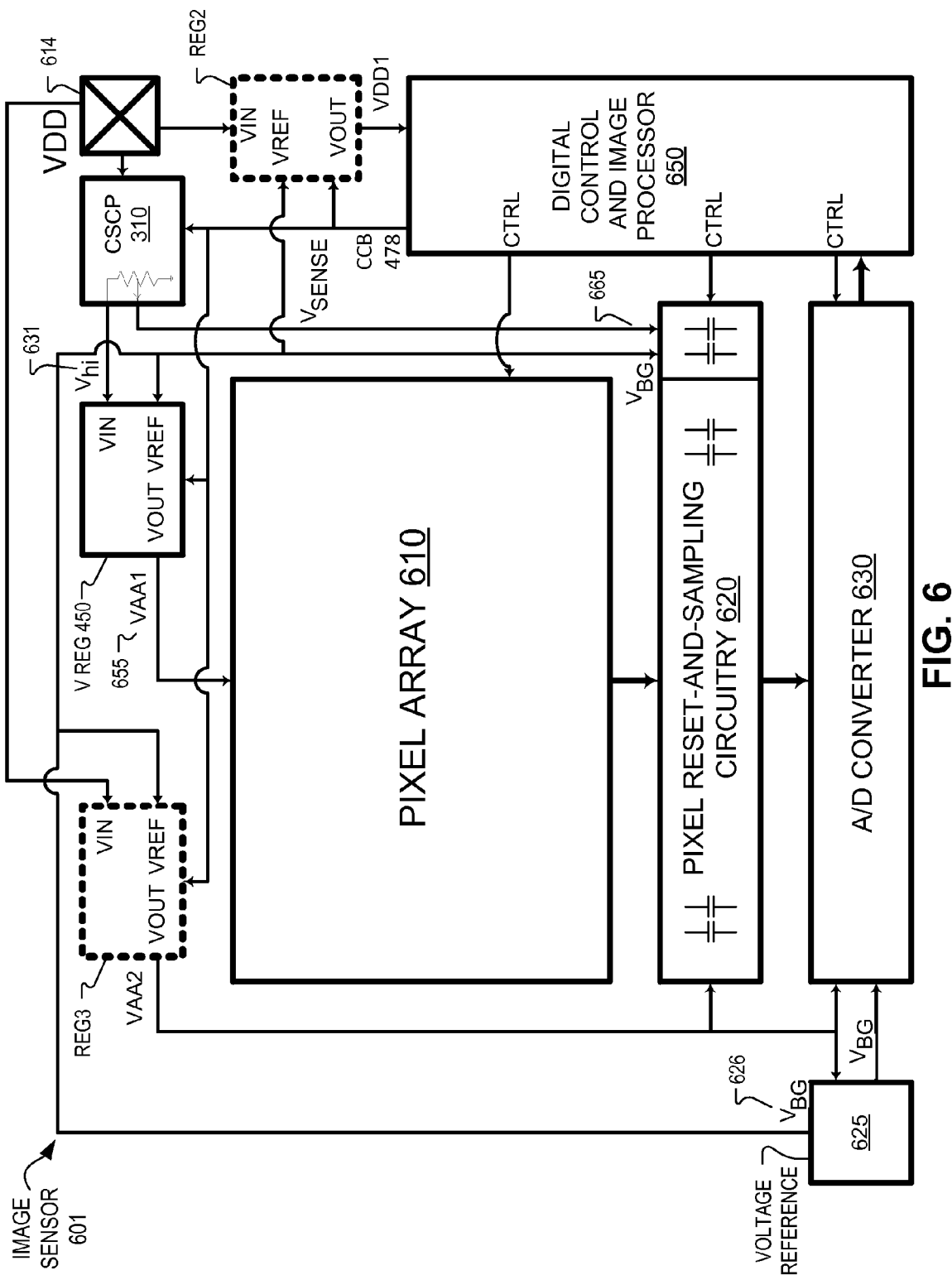
FIG. 6 shows an example image sensor that includes a capacitance selectable charge pump in a digital control loop, in accordance with an embodiment of the disclosure.

FIG. 6 shows an example image sensor 601 that includes a capacitance selectable charge pump 310 in a digital control loop, in accordance with an embodiment of the disclosure. Image sensor 601 includes image sensor voltage input 614 having a voltage potential of VDD. Image sensor voltage input 614 may be the only voltage input on image sensor 601 that supplies power for the image sensor components; although other communication signal inputs and outputs (not shown) may be included in image sensor 601. Image sensor 601 also includes CSCP 310 having an input coupled to image sensor voltage input 614. CSCP 310 has an output coupled to output a stepped-up voltage (e.g. $V_{hi}$ 631) that is higher than the voltage potential of the input voltage.

In the illustrated embodiment, voltage regulator 450 is coupled to the output of CSCP 310 and regulates $V_{hi}$ 631 down to VAA1 655, which is supplied to pixel array 610. In one embodiment, voltage regulator 450 is a linear regulator. In one embodiment, $V_{hi}$ 631 is at approximately 2.7 Volts and VAA1 655 is at approximately 2.5 Volts. Pixel array 610 is coupled to receive VAA1 655 and is configured to capture an image. Pixel reset-and-sampling circuitry 620 is coupled to read pixel values from the pixel array. Pixel reset-and-sampling circuitry 620 may be configured to readout pixel array 610 row-by-row or column-by-column. Analog-to-digital ("A/D") converter 630 is coupled to pixel reset-and-sampling circuitry 620 to convert the analog pixel values into digital pixel values.

Digital Control and Image Processor ("DCIP") 650 is coupled to receive the digital pixel values from A/D converter 630. DCIP 650 is coupled to pixel array 610 to control the image acquisition process. DCIP 650 is also coupled to pixel reset-and-sampling circuitry 620 and to A/D converter 630 to control the readout and A/D conversion of the pixel values. An optional voltage regulator (e.g. REG2), may be coupled between image sensor voltage input 614 and DCIP 650 if DCIP 650 requires a higher voltage than $V_{hi}$ 631 or as a way to further improve the rejection of power supply noise.

DCIP 650 is coupled to separately select the capacitance charge pump modules included in CSCP 310 using CCB 478. DCIP 650 may select any combination of capacitance charge pump modules (e.g. CCPM 315, 320, and/or 325) to step up VDD to $V_{hi}$ 631. Similar to the timing diagrams in FIG. 3C, DCIP 650 may pump the selected capacitance charge pump modules at a pump frequency that is substantially the same. The combination of the CCPMs that DCIP 650 selects depends on a current draw of pixel array 610. In addition to controlling which CCPMs are selected, CCB 478 may also be coupled to control a low power mode selector 454 of voltage regulator 450 when a low amount of current is required by pixel array 610.

In the illustrated embodiment, voltage reference 625 provides reference voltage $V_{BG}$ 626 to A/D converter 630, voltage regulator 450, REG2, REG3, and to pixel reset-and-sampling circuitry 620. In the illustrated, $V_{BG}$ 626 is provided to pixel reset-and-sampling circuitry 620 as part of a digital control loop that may ensure that $V_{hi}$ 631 is independent of process, voltage and temperature variations, as well as current consumption from VAA1 655. In the illustrated embodiment, pixel reset-and-sampling circuitry 620 and A/D converter 630 have a "dummy column" of pixel readout circuitry that receives $V_{hi}$ 631 and $V_{SENSE}$ 665. Using a "dummy column" may utilize circuits that are already designed and may utilize circuits that are already on-board image sensor 601. In the illustrated embodiment, $V_{SENSE}$ 665 represents the voltage on $V_{hi}$ 631 (via a voltage divider), which may be representative of the current draw of pixel array 610. A voltage divider may reduce $V_{hi}$ 631 (by a known ratio) to a voltage level that is acceptable to pixel reset-and-sampling circuitry 620.

In the illustrated embodiment, DCIP 650 is coupled to read the dummy column from A/D converter 630 that includes digital representations of $V_{BG}$ 626 and $V_{SENSE}$ 665. It is appreciated that $V_{SENSE}$ 665 is only one example of monitoring a current draw of pixel array 610 and that other configurations could be used to monitor the current draw of pixel array 610. DCIP 650 may determine a difference between $V_{BG}$ 626 and $V_{SENSE}$ 665 (which is $V_{hi}$ 631 divided by a constant factor). The constant factor may be obtained from a programmable resistor or capacitor divider. The digital representation of a difference between $V_{BG}$ 626 and $V_{SENSE}$ 665 is driven to zero. In one embodiment, a Proportional-Integral ("PI") controller is used to determine controlling CCB 478 to select the CCPMs of CSCP 310 that are required to meet the current demands of pixel array 610. Two different controllers (within DCIP 650) may be used to determine controlling CCB 478 depending on whether pixel bias currents of pixel array 610 are enabled or not.

In one example, DCIP 650 is reading out pixel array 610 with a row time of 20 μs. In this example, $V_{SENSE}$ 665 may be sampled (via the dummy column on A/D converter 630) at 50 kHz. Advantageously, high frequency noise that is greater than 50 kHz may be suppressed by voltage regulator 450.

It is appreciated that DCIP 650 may control CCB 478 based on a predictable load variation of pixel array 610, in addition to controlling CCB 478 based on monitoring a signal (e.g. $V_{hi}$ 631) that represents a current draw of pixel array 610. For example, because DCIP 650 is coupled to control pixel array 610, DCIP 650 may be able to predict a low or high current demand of pixel array 610 based on the control signals sent to pixel array 610. Consequently, DCIP 650 may increase or decrease (via CCB 478) the current delivered by CSCP 310 to step up VDD to $V_{hi}$ 631 based on a predictable current demand increase of pixel array 610. As discussed above, selecting and deselecting CCPMs of CSCP 310 increases and decreases the capacitance of the charge pump in CSCP, which increases and decreases the current that CSCP 310 is able to supply.

One possible advantage of the illustrated embodiment is that VDD may be the only pad for supply power to image sensor 601. This may decrease the size of image sensor 601 and make it easier to implement image sensor 601 because only one power supply voltage would be required to power image sensor 601.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor comprising:
    a capacitance selectable charge pump including:
        a pump input coupled to an image sensor voltage input;
        a pump output coupled to output a stepped-up voltage; and
        an array of capacitance charge pumps coupled to step-up an input voltage on the pump input to the stepped-up voltage on the pump output;
    a voltage regulator coupled to the pump output and coupled to output a pixel voltage;
    a pixel array coupled to receive the pixel voltage from the voltage regulator; and
    a control module coupled to separately select each one of the capacitance charge pumps in the array to step-up the input voltage in response to a current draw of the pixel array, wherein the control module is configured to run said each one of the selected capacitance charge pumps in the array at a same substantially fixed frequency.

2. The image sensor of claim 1, wherein the control module is coupled to receive a sense signal representative of the current draw of the pixel array.

3. The image sensor of claim 1, wherein the control module is coupled to a low power mode selector of the voltage regulator and configured to activate a lower power mode of the voltage regulator in response to the current draw of the pixel array.

4. The image sensor of claim 1 further comprising:
    a voltage reference, wherein the control module is coupled to receive a reference voltage signal from the voltage reference.

5. The image sensor of claim 1 further comprising:
    pixel reset-and-sampling circuitry coupled to read out pixel values from the pixel array; and
    an analog-to-digital ("A/D") converter module coupled to the pixel reset-and-sampling circuitry to convert the pixel values into digital pixel values, wherein the control module is coupled to receive the digital pixel values from the A/D converter module.

6. The image sensor of claim 5, wherein the control module is coupled to control the pixel array, pixel reset-and-sampling circuitry, and the A/D converter module.

7. The image sensor of claim 5 further comprising:
    a voltage reference, wherein the pixel reset-and-sampling circuitry is coupled to receive a reference voltage signal from the voltage reference and coupled to receive a stepped-up voltage signal representative of the stepped-up voltage,
    and wherein the A/D converter module is coupled to convert the reference voltage signal and the stepped-up voltage signal into digital voltage values and the control module is coupled to read the digital voltage values.

8. The image sensor of claim 7, wherein the reference voltage signal and the stepped-up voltage signal are converted to digital values with a dummy column of pixel readout circuitry that is used to readout the pixel values of the pixel array.

9. The image sensor of claim 1, wherein the image sensor voltage input is the only supply voltage of the image sensor.

10. The image sensor of claim 1, wherein a second voltage regulator is coupled between the image sensor voltage input and a control supply voltage input of the control module.

11. The image sensor of claim 1, wherein the current draw is an anticipated current draw that is predicted by the control module based on inputs or outputs of the control module.

12. A step-up converter comprising:
an input coupled to receive a first voltage potential;
an output coupled to output a second voltage potential higher than the first voltage potential;
an array of capacitance charge pumps, wherein each of the capacitance charge pumps in the array includes switches to be modulated to individually run each of the capacitance charge pumps by selectively connecting each of the capacitance charge pumps to the input and the output; and
a control module coupled to the switches of each of the capacitance charge pumps and configured to modulate the switches at a substantially fixed frequency, wherein the control module modulates the switches of selected capacitance charge pumps in the array in response to a current draw on the output.

13. The step-up converter of claim 12, wherein modulating the switches to run selected capacitance charge pumps includes only running capacitance charge pumps in the array that provide a combined capacitance that is a minimal needed capacitance required to supply the current draw on the output.

14. The step-up converter of claim 12, where each of the capacitance charge pumps has a different capacitance.

15. The step-up converter of claim 12, wherein there are n number of capacitance charge pumps in the array and a capacitance value of any given capacitance charge pump is approximately given by $C \times 2^i$, where C is a first capacitance value of a first capacitance charge pump in the array of capacitance charge pumps and where i is a position in the array of the given capacitance charge pump and i starts at zero with the first capacitance charge pump and is incremented for every additional capacitance charge pump in the array until i equals n−1.

16. The step-up converter of claim 12, wherein the control module is coupled to receive a sense signal representative of the current draw on the output.

17. The step-up converter of claim 12, wherein the current draw is an anticipated current draw that is predicted by the control module based on inputs or outputs of the control module.

18. The step-up converter of claim 12 further comprising:
a voltage regulator coupled to the output to regulate the second voltage potential, wherein the control module is coupled to a low power mode selector of the voltage regulator and configured to activate a lower power mode of the voltage regulator in response to the current draw on the output.

19. A method of regulating a power supply comprising:
sampling an output voltage from an output of a capacitance selectable charge pump ("CSCP"), wherein the CSCP includes an array of capacitor charge pumps; and
activating or deactivating capacitor charge pumps in the array of capacitor charge pumps in response to the output voltage, wherein each capacitor charge pump in the array of capacitor charge pumps is configured to be coupled to an input of the CSCP and configured to be coupled to the output of the CSCP; and
running the activated capacitor charge pumps at a same substantially fixed frequency.

20. The method of regulating a power supply of claim 19, wherein the activated capacitor charge pumps in the array provide a combined capacitance that is a minimal needed capacitance of the CSCP that is required to maintain a specific voltage on the output of the CSCP.

21. The method of regulating a power supply of claim 19 further comprising:
sampling a reference voltage from a voltage reference and determining a difference between the reference voltage and the output voltage, wherein activating or deactivating the selected capacitor charge pumps in the array in response to the output voltage is based at least in part on the difference between the reference voltage and the output voltage.

22. The method of regulating a power supply of claim 19 further comprising:
activating a low power mode on a voltage regulator coupled to the output of the CSCP when a current draw on the output of the CSCP is below a specific level.

* * * * *